July 6, 1943.　　　W. B. WHEATLEY　　　2,323,859
MULTIPLE CONTROL UNIT
Filed Dec. 24, 1940　　　2 Sheets-Sheet 1
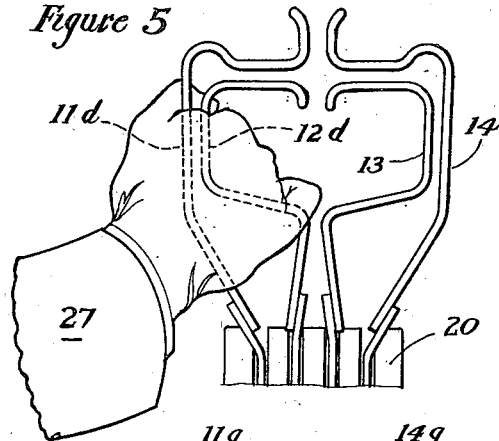
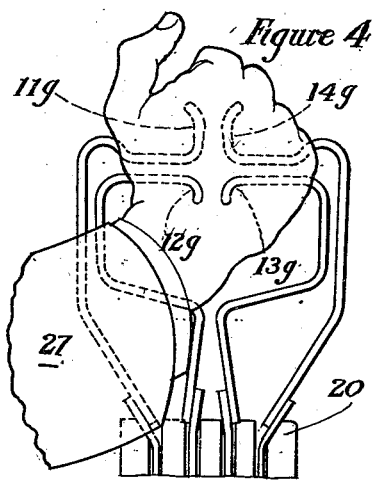
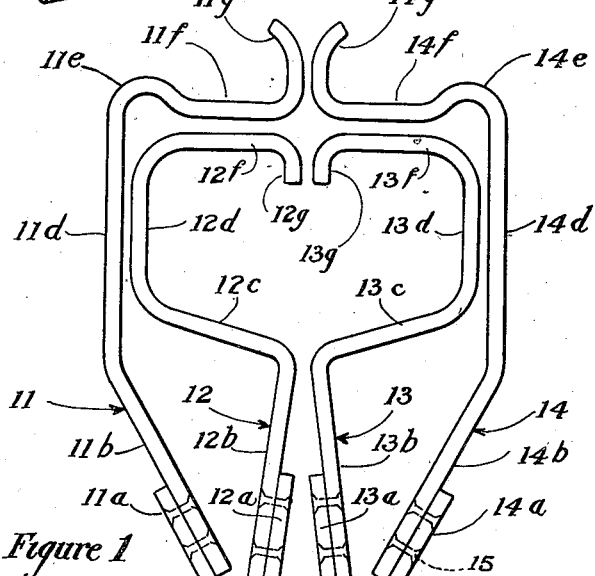
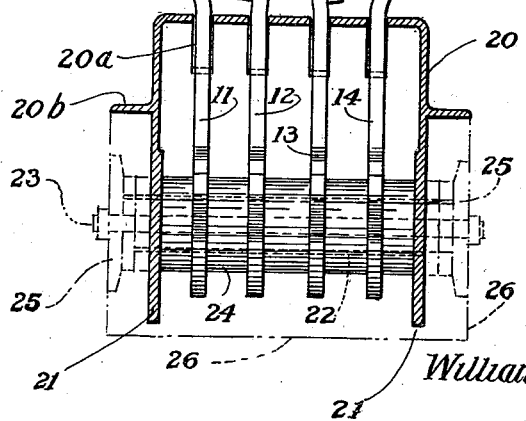
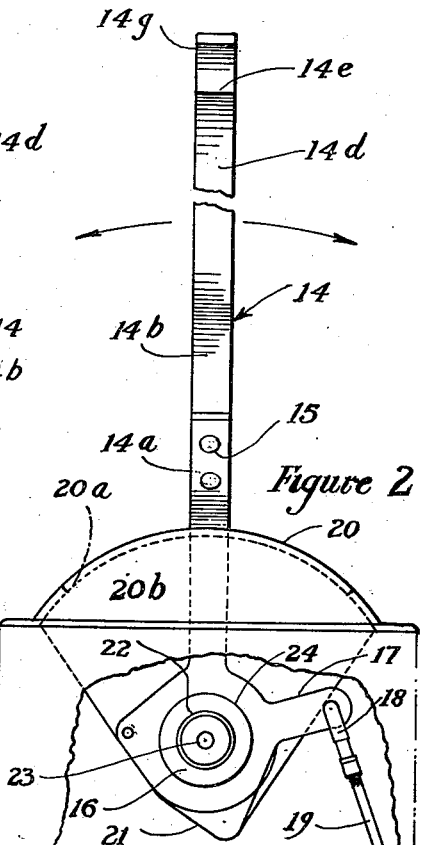
William B. Wheatley INVENTOR.
BY James M. Clark
his Patent Attorney

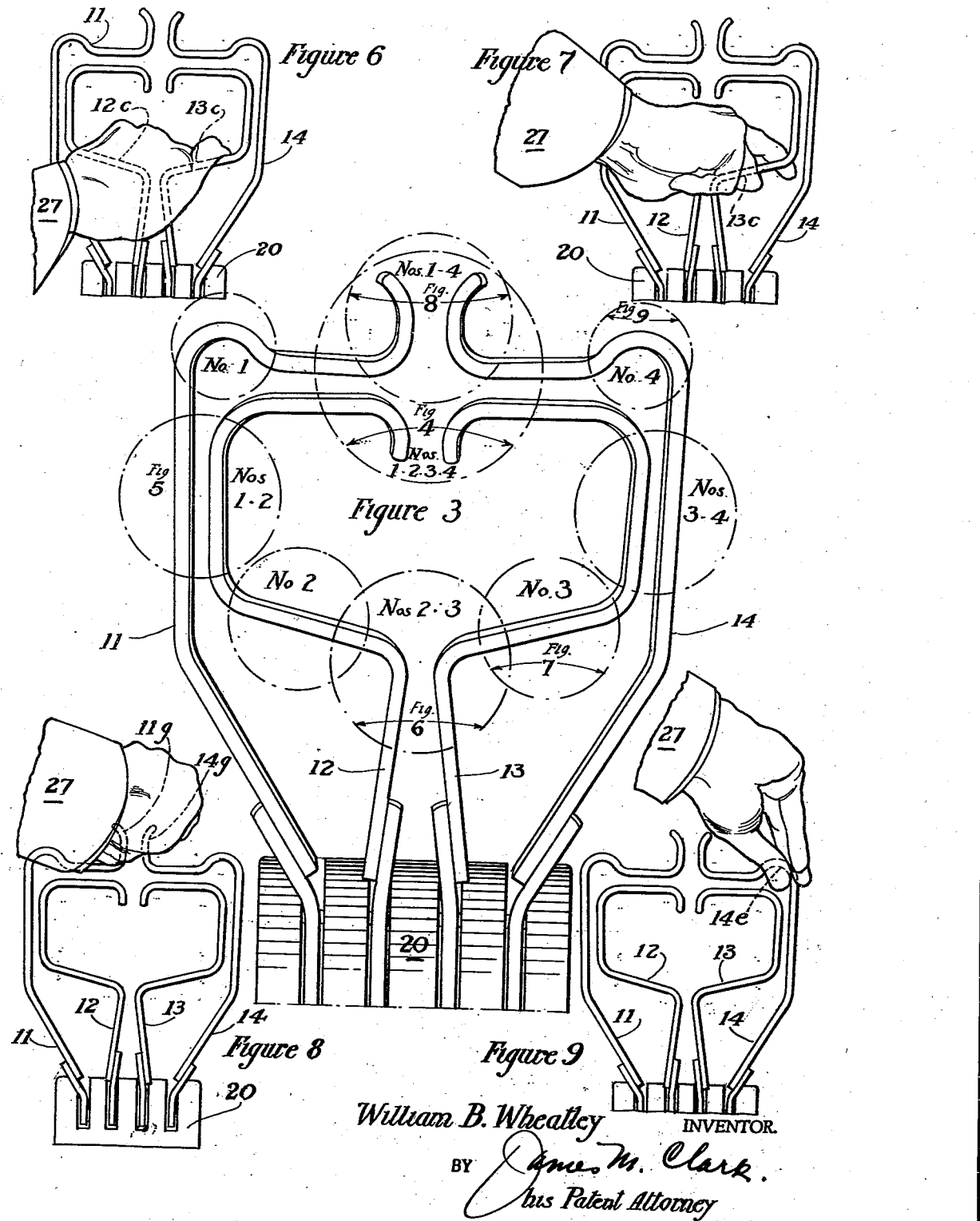

Patented July 6, 1943

2,323,859

UNITED STATES PATENT OFFICE 2,323,859

MULTIPLE CONTROL UNIT

William B. Wheatley, San Diego, Calif., assignor to Consolidated Aircraft Corporation, a corporation of Delaware Application December 24, 1940, Serial No. 371,465

14 Claims. (Cl. 74—491)

The present invention relates to manual control devices and more particularly to improvements in such devices for selectively and simultaneously operating a plurality of controls.

In the operation of multiple controls such as in multi-motored aircraft and the like, it is frequently desirable that either one of several controls be operated separately from the remainder, that a pair or group of the total be separately operated or that the entire bank of controls be operated simultaneously. In the operation of aircraft, particularly, such devices are required for the throttle, mixture and heat controls of the engines, for propeller adjustments, and a number of other controls. Numerous arrangements have been suggested and used for such multiple controls but when three or more controls have been grouped many have become objectionable due to the difficulty in grasping all for simultaneous operation and the excessive manual force required in moving the entire group as compared to the forces for moving lesser groupings.

It is accordingly an object of the present invention to provide a manual control arrangement for a plurality of devices, each of which may be selectively controlled either separately, in pairs or groups, or all of which may be operated simultaneously. A further object contemplates a novel arrangement, shape and relationship of the several control levers which permit their being grasped and operated in any of the groupings selected by a single hand of the operator. A further object of the present invention resides in a control lever arrangement in which sufficiently advantageous leverage is provided particularly when the entire bank of levers are operated simultaneously, and wherein the manual forces are maintained relatively uniform for the plural control groupings for improved "feel" and fineness of control.

Other advantages of the present invention will become apparent to those skilled in the art after a reading of the present description and the accompanying drawings forming a part hereof, in which:

Fig. 1 is an elevational view looking in a forward direction of the multiple control arrangement comprising my invention;

Fig. 2 is a side elevational view of the same;

Fig. 3 is an enlarged view of the levers shown in Fig. 1 indicating the various operating groups;

Fig. 4 shows a manner of grasping all the levers for simultaneous operation; Fig. 5 shows the manner of operating a pair of levers to one side; Fig. 6 shows the manner of operating the two central levers; Fig. 7 shows the manner of operating an inside lever; Fig. 8 shows the manner of operating two outside levers; and Fig. 9 shows the method of operating a single outside lever.

Referring now to Figs. 1 and 2 the numerals 11, 12, 13 and 14 indicate a bank of control levers suitable for the operation of the engines or motors of a four-engined airplane. By way of example the present arrangement has been indicated as applicable to the throttle control of the four engines, but it is also set forth that the mechanism shown is equally adapted for use with the mixture or heat controls of the engines, for the propeller controls, or a number of other of the multiple devices necessary to be adjusted in aircraft. The levers 11, 12, 13 and 14 are shown constructed in upper and lower sections suitably fastened by the rivets 15 and provided with shank portions having central apertures 16 for their pivotal mounting upon the fulcrum tube 22. The construction shown is that for an experimental installation but in a production installation the riveted joints are preferably eliminated and an integral, or one-piece lever utilized. The shank portion of each lever is provided with an apertured extension 17 to which the adjustable clevis 18 is pivotally attached and which in turn forms the terminal of the operating push rod 19 which extends, in a suitable manner well known to the art, to the throttle of the respective engines.

The shank portions of the levers 11, 12, 13 and 14 are intermediately spaced by the washers 24 on the fulcrum tube 22 such that the levers are permitted to partially rotate about the fulcrum axis within the arcuate slots 20a of the control housing cover 20. The latter is provided with outwardly extending flanges 20b and downwardly extending portions 21 which are suitably apertured to receive the fulcrum tube 22. The unit comprising the levers, their spacing washers 24 and the tube 22 is suitably retained in a manner well known to the art by the retaining bolt 23 and the end washers 25 which are suitably housed in the wall portions of the control housing 26.

The shank portions of the control levers preferably extend in a radial direction from the axis of the tube 22 to points beyond the cylindrical surface of the control box cover 20 at which they are bent in axial directions with respect to their common axis, outwardly in the case of portions 11a and 14a, and inwardly toward each other in the portions 12a and 13a. The levers are preferably made from metallic bar stock with the corners and edges well rounded for comfortable handling although the teachings of my invention are applicable to a wide variety of forms, materials and methods of construction. The lower portion 11b of the upper half is similarly bent to the same angle as 11a such that a vertical portion 11d is provided, and an arcuate or bulging corner provided at 11e, as the lever extends inwardly in a horizontal direction through the portion 11f before it terminates in an outwardly returned curve at 11g. It will be noted that the lever 14 is bent exactly the same as lever 11 such that when fastened to its shank portion it is oppositely or symmetrically disposed, and the terminating portions 11g and 14g adjoin each other with a suitable clearance which actual operation of the unit indicates should preferably be about a quarter of an inch.

The lower portion 12b of the lever 12 is bent such that its slightly sloping portion 12c changes direction abruptly with respect to that of portion 12b, and is further provided with a vertical portion 12d, parallel to and adjoining 11d, of the outer lever, returning in a similar horizontal portion 12f and an inwardly curved terminal portion 12g. The lever 13 is bent to exactly the same shape as lever 12 such that in being oppositely assembled on the outside of its shank portion 13a it is symmetrically arranged and has vertical and horizontal portions 13d and 13f which parallel and are contiguous to the corresponding portions of the lever 14. The fillets connecting the portions 12b and 12c and the corresponding fillet of the lever 13 closely approach each other such that they clear in passing, but can be conveniently grasped together for simultaneous operation. Likewise the curved terminal portions 12g and 13g closely approach but clear each other such that they extend downwardly in substantial alignment with the portions 11g and 14g of the outside levers whereby a grasping station in the form of a cross or a horizontal bar with upper and lower protrusions are formed for convenient grasping by the hand of the operator.

Fig. 3 shows by means of the circles outlined in dash-dot lines the numbers of the engines which are operated by the various lever groupings. When used in a multi-motored aircraft the control unit disclosed is preferably disposed between the two seats of the pilots, in a dual control airplane, and slightly forward of the seats such that the unit is within convenient reach of the right hand of the pilot who sits in the left or port seat, and the left hand of the other, or co-pilot, who may be seated in the right, or starboard seat. For the sake of convenience in the present description the four engines of the airplane installation are numbered such that engine No. 1 is the left outboard engine corresponding to lever 11, engine No. 2 is the left inboard engine corresponding to lever 12, engine No. 3 is the right inboard engine corresponding to lever 13 and engine No. 4 is the right outboard engine corresponding to lever 14. Forward movement of any one of the four levers about its fulcrum 22 results in corresponding adjustment of the throttle of that particular engine through the lever 17 and the push pull linkage 18 and 19 such that the engine is speeded up, although it is obvious that the linkage may be arranged such that pulling of the lever rearwardly toward the pilot could be made to speed up the engine. In either case, each of the levers is arranged such that when rotated together in one direction the engines are preferably speeded up to the same extent, and rotation of all simultaneously in the opposite direction results in slowing down all engines equally.

In Fig. 3 it will be noted that the control of engine No. 1 is obtained by either pilot grasping the bulging corner portion 11e of the lever 11 indicated by the construction circle marked No. 1. Likewise the separate control of engine No. 2, without disturbing the other engine settings, is obtained by grasping the lever 12 in the region of the circle marked No. 2. The control of engine No. 3 is likewise operated singly by grasping lever 13 at the circled area marked No. 3, and is indicated in detail in Fig. 7 in which the right hand 27 of the pilot, occupying the seat on the port, or left side of the airplane looking in a forward direction, grasps the portion 13c. Similarly when it is desired that engine No. 4 be separately controlled it is grasped at the corner 14e by the pilot as specifically shown in Fig. 9. Obviously when the various control combinations are operated by the pilot occupying the right or starboard pilot seat his left hand would normally be used to operate the controls.

When it is desired that the two engines on the left side of the aircraft be controlled as a unit as in turning movements, the vertical portions 11d and 12d of the levers 11 and 12 are grasped as shown in Fig. 5 resulting in control of engines Nos. 1 and 2. Similarly when engines Nos. 3 and 4 are to be controlled together the pilot grasps the corresponding portions 13d and 14d of the respective levers which are moved either backward or forward as a unit, and the two inboard engines Nos. 2 and 3 are controlled as a unit by the pilot grasping the regions 12c and 13c, as shown in detail in Fig. 6. When it is desired that each of the outboard engines 1 and 4 be operated together the two terminal portions 11g and 14g are grasped as shown in Fig. 8, and when all four engines are to be controlled simultaneously the pilot's hand grasps the gripping station indicated by the large circle enclosing the terminals or "g" portions of all four levers as shown in detail in Fig. 4.

It should be noted that, assuming that each of the four adjustments require the same pilot torque, the group of four levers will require substantially double the pilot torque for their movement as the grouping of any pair of levers will require, and approximately four times that of the operation of any single lever. The gripping stations of the present device provide that the lever arm is increased when shifting from the operation of the engines in three of the four combinations of pairs to the operation of all four engines simultaneously. This is accomplished by having the lever arm at its maximum for the simultaneous control group as shown in Figure 4. It is accordingly a desirable advantage of the present device that the pilot is not required to develop a particularly sensitive touch or feel of the controls since the effort expended in simultaneously adjusting all of the engines is not much more than in adjusting three of the four combinations of pairs of engines, and in each of these cases the leverage is adequate that adjustments are made with little effort on the part of the pilot.

The improved multiple control described above is readily modified for the control of two, three, five, six or more elements with all the advantages of the four-element control which has been selected for purposes of explaining this invention. When two units are to be controlled either the outer pair of levers 11 and 14, or the inner pair 12 and 13 can be utilized; for a three control unit the arrangement shown in Fig. 3 is used with the inner levers 12 and 13 formed into a single "spade-handle" lever for the central unit. A five-unit control is preferably formed by inserting a straight central lever in the middle of the bank shown in Fig. 3 and having it terminate in the region of the "g" extremities, and a six-unit control is formed by inserting a pair of symmetrical levers between 11 and 12 and between 13 and 14 terminating in the same "g" area referred to.

While the arrangement shown is in a simplified form, it has been found extremely satisfactory in many hours of use in airplanes in actual flight. The control unit described can be hung from above in an inverted position from that shown in the drawings, or where the installation requirements are such as to make it desirable, it could be disposed horizontally, or at any other angle, or it could be placed on the side of the control compartment. In the case of dual control airplanes, however, the position described above is the most preferable, that is, vertically between the two pilots as shown, or inverted or horizontal where it can be operated with equal ease by either pilot. The conventional use of rounded gripping knobs has been dispensed with but could be added if desired, a major consideration in the arrangement being that the size of the space just below the "g" intersection is such that there is ample room for a pilot's heavy glove as worn in winter flying. The form of the various levers may be modified within wide limits and still retain the essential idea of the present invention that all or various combinations could be operated with a single movement of one of the pilot's hands as determined by the particular area which it grips.

Other advantages and modifications of the present invention, both in arrangement and detail design which may become obvious to those skilled in the art are intended to come within the scope and spirit of the present invention as set forth in the following claims.

I claim:

1. A multiple control device comprising a bank of laterally disposed levers arranged in outer and inner pairs individually mounted for pivotal movement about a common axis, said outer levers being formed within the plane of said lateral direction such that their outer free terminals closely approach each other, and said inner levers being formed in said lateral plane such that they first approach each other and secondly approach the adjacent outer levers, each of said levers provided with a plurality of gripping portions, whereby either joint control of all levers, group control of said inner, outer, or adjacent pairs of levers or individual control of any one lever is obtained.

2. A multiple control device comprising a bank of laterally disposed levers mounted for individual pivotal movement about a common axis, the said bank including pairs of inner and outer levers laterally spaced in the direction of said axis, each lever of each pair being laterally formed such that it provides gripping portions closely adjacent to the other lever of its own pair and such that it also provides gripping portions closely adjacent to the lever of the adjoining pair, whereby any lever or any said inner, outer or adjacent pair of levers in the bank may be gripped by a single hand of an operator for either single or group control respectively.

3. A manual control device comprising a bank of laterally spaced levers mounted for individual pivotal operation about a common laterally extending axis, an outer pair of said levers being formed in said lateral direction such that they provide grasping portions which closely approach each other farther from said axis than said intermediate levers, and levers in an intermediate group being formed such that they provide grasping portions which approach closely adjacent to each other and to the grasping portions of said outer pair, whereby all, said outer pair, said intermediate group or any said adjacent pair of the levers in the bank are conveniently grasped for simultaneous group actuation by a single hand of an operator.

4. A multiple control device for individual and simultaneous operation comprising a bank of laterally disposed levers pivotally mounted for separate rotation about a laterally extending common axis, said bank including an outer pair of levers and a plurality of remaining intermediate levers, said outer pair of levers being laterally formed such that they approach each other in a gripping area beyond the remaining intermediate levers, the said remaining levers being formed laterally such that gripping portions are provided closely adjacent the intermediate portions of the said outer levers for joint rotation therewith, said remaining levers also being formed laterally such that they approach the said outer levers in the said gripping area whereby individual operation of any lever or the simultaneous operation of said entire bank of levers is accomplished by the single hand of an operator.

5. In a manual control device provided with laterally disposed pivoted levers adapted for both joint and separate operation by the single hand of an operator, a pair of said levers each pivoted at one extremity and having the other extremities terminate adjacent each other for joint operation, and said levers having the portions intermediate said extremities remotely spaced laterally with respect to each other for separate operation.

6. A multiple control device comprising a bank of laterally disposed levers mounted for pivotal movement, outer levers of said bank being bent in lateral directions such that their outer terminals approach each other, the inner levers of said bank being bent such that they both approach each other and the adjacent outer levers, whereby any single or pair of adjacent levers may be grasped by a single hand of an operator without interference with the other levers.

7. A multiple control device comprising a bank of laterally disposed levers mounted for both separate and joint pivotal movement about a common laterally extending axis, the said bank including pairs of inner and outer levers, each lever of each pair being laterally bent such that it provides portions both closely adjacent to the other lever of its pair and closely adjacent a lever of the adjoining pair, whereby any single or any two adjoining levers may be gripped by a single hand of an operator for separate or joint control respectively without interference with the other levers.

8. In a multiple selective control device adapted for individual, joint and group control, a plurality of laterally disposed members mounted for rotary movement about a laterally extending axis, the endmost pair of said laterally disposed members extending radially outward a greater distance from said axis than said intermediate members and having their outer free terminals formed to terminate adjacent each other to form a group gripping portion, said intermediate members having their inner portions formed to approach each other to provide a group gripping portion and having their outer free terminals formed to terminate adjacent each other and adjacent said outer terminals of said endmost members to provide therewith a joint gripping portion, said intermediate members having their intermediate portions laterally outwardly directed adjacent said endmost members to provide therewith group gripping portions, whereby any one, all or any group of said members may be gripped for actuation by a single hand of an operator.

9. In a control device, a plurality of radially extending levers pivoted for separate rotational movements about a common laterally extending axis, certain of said levers being formed laterally in the plane of said axis such that they provide individual gripping portions remotely disposed with respect to each other, each of said levers being further formed such that they approach each other in a group gripping portion at a greater distance from said common axis than said remotely spaced portions, whereby single and group control of said levers is provided by the gripping by a single hand of an operator of said respective gripping portions.

10. In a manual control device provided with laterally spaced pivoted levers adapted for both joint and separate operation by the single hand of an operator, at least two of said levers having their outer free extremities formed such that they are adjacent each other for joint operation, said levers having their intermediate portions formed such that these portions are remotely spaced laterally with respect to each other for said separate operation.

11. A multiple control device for a plurality of motors comprising a plurality of laterally arranged levers mounted for pivotal movement about a common axis, one of said levers being formed such that it is bent in a first direction and its outer extremity bent in an opposite direction, both directions lying in a radial plane passing through said common axis, a second lever bent such that its intermediate portion is displaced in said second direction and its outer extremity extended in said first direction whereby the intermediate portions of said levers are remotely displaced for separate control and their outer extremities adjacently disposed for joint control.

12. A multiple selective control device adapted for individual, joint and group control, comprising a plurality of laterally disposed members mounted for individual rotary movement about a laterally extending axis, the endmost of said members extending radially outward a greater distance from said axis than said intermediate members and having their outer portions contiguous to each other to form a group gripping portion, said intermediate members having portions formed to approach each other to provide a group gripping portion, said intermediate members having portions formed to approach intermediate portions of said endmost members to provide therewith a further group gripping portion, and said intermediate members also having outer portions formed closely adjacent each other and the first said group gripping portion of said endmost members to form with each other a group gripping portion and to form with said endmost members a joint gripping portion whereby all of said members may be gripped for actuation by a single hand of an operator.

13. A multiple selective control device adapted for individual, joint and group control by a single hand of an operator comprising a plurality of laterally disposed members mounted for individual rotary movement about a laterally extending axis, the endmost pair of said members extending radially outward a greater distance from said axis than the innermost of said members and having their outer portions formed contiguous to each other to provide a group gripping portion, the innermost of said members having portions formed contiguous to each of said endmost members forming remotely spaced group gripping portions therewith, the innermost of said members being also formed to provide a portion contiguous to the said group gripping portion of said endmost members to provide therewith a joint gripping portion for operation of all said members.

14. A multiple selective control device adapted for individual, joint and group control by a single hand of an operator comprising a plurality of laterally disposed members mounted for individual rotary movement about a laterally extending axis, the endmost pair of said members extending radially outward a greater distance from said axis than the innermost pair of said members and having their outer portions formed contiguous to each other to provide a group gripping portion, said innermost pair of members having portions formed contiguous to each of said endmost members forming remotely spaced group gripping portions therewith, said innermost pair of members also formed to provide a portion contiguous to the said group gripping portion of said endmost members to provide therewith a joint gripping portion for operation of all said members, each of said members having individual gripping portions toward their pivotal axis whereby said individual, group and joint gripping portions are progressively further disposed from said pivotal axis.

WILLIAM B. WHEATLEY.